US012659768B2

(12) United States Patent　　　　(10) Patent No.:　　US 12,659,768 B2
Kim et al.　　　　　　　　　　　　　(45) Date of Patent:　　　Jun. 16, 2026

(54) CHANNEL IDENTIFICATION AND QUALITY EVALUATION USING ARTIFICIAL INTELLIGENCE (AI) / MACHINE LEARNING (ML) PATTERN RECOGNITION

(71) Applicant: VIAVI SOLUTIONS INC., Chandler, AZ (US)

(72) Inventors: Jong-Min Kim, Seoul (KR); Yoo-Chul Shin, Seoul (KR); Sang-Young Jung, Seoul (KR); Young-Kill Kim, Seoul (KR)

(73) Assignee: VIAVI SOLUTIONS INC., Chandler, AZ (US)

( * ) Notice: Subject to any disclaimer, the term of this patent is extended or adjusted under 35 U.S.C. 154(b) by 281 days.

(21) Appl. No.: 18/531,270

(22) Filed: Dec. 6, 2023

(65) Prior Publication Data

US 2025/0193710 A1　　Jun. 12, 2025

(51) Int. Cl.
　　　*H04W 24/06*　　　(2009.01)
　　　*G06T 11/26*　　　(2026.01)
　　　*H04W 64/00*　　　(2009.01)
(52) U.S. Cl.
　　　CPC ............. *H04W 24/06* (2013.01); *G06T 11/26* (2026.01); *H04W 64/006* (2013.01); *G06T 2200/24* (2013.01)
(58) Field of Classification Search
　　　CPC ..... H04W 24/08; H04W 24/10; H04W 24/02; H04W 24/06; H04W 48/16; H04W 16/14; H04W 24/00; H04W 72/0453; H04L 43/045; H04L 27/0012; H04L 43/16; H04L 63/1425; H04L 63/1483; H04B 17/391; H04B 17/3912; H04B 1/0003; H04B 17/15; H04B 17/21; H04B 17/30; H04B 17/309; G01R 23/16; G01R 23/02; G01R 23/18; G01R 29/0892; G06N 20/00; G06N 3/08;

(Continued)

(56) References Cited

U.S. PATENT DOCUMENTS

2021/0136603 A1 *　5/2021　Kottkamp ................ G06N 3/08
2022/0045699 A1　　2/2022　Germer et al.

(Continued)

OTHER PUBLICATIONS

European Patent Office, "The extended European Search report for Application No. EP24212678.7", dated May 13, 2025, 9 pages.

*Primary Examiner* — Lester G Kincaid
(74) *Attorney, Agent, or Firm* — Mannava & Kang, P.C.

(57)　　　　　　　ABSTRACT

Methods and systems for over the air channel analysis through artificial intelligence (AI)/machine learning (ML) aided pattern recognition are provided. A shape of a signal (e.g., control signal) may be detected through image analysis using AI/ML and technology of signal in a channel of interest may be determined from the shape. Next, the control channel (SSB, SIB1) may be determined based on period. A user (e.g., a technician) may be provided with center frequency and bandwidth for LTE or SSB, SIB1 for NR to assist with diagnosis and maintenance of the corresponding channel. Furthermore, channel analysis (e.g., EVM, SNR, time error) may be performed without demodulation and provided to the user. Moreover, massive MIMO performance may also be measured based on power difference between broadcast beam and user beam for data throughput evaluation.

20 Claims, 13 Drawing Sheets

(58) Field of Classification Search
CPC .......... G06N 3/045; G06N 3/09; G06N 3/044;
G06N 3/092; G06N 3/0895; G06N
3/0464; G06N 3/0442
See application file for complete search history.

(56) References Cited

U.S. PATENT DOCUMENTS

2022/0113340 A1*  4/2022  Kacenjar .............. G01R 23/167
2022/0377678 A1*  11/2022  Rahman ............... H04B 1/3838
2023/0052023 A1  2/2023  Chen et al.

* cited by examiner

DETECT SHAPE THROUGH IMAGE ANALYSIS
702

DETERMINE TECHNOLOGY OF THE SIGNAL
704

DETERMINE CONTROL CHANNEL (SSB, SIB1) BASED ON
PERIOD
706

PERFORM CHANNEL ANALYSIS WITHOUT DEMODULATION
708

MEASURE MASSIVE MIMO PERFORMANCE BASED ON
POWER DIFFERENCE
710

CHANNEL IDENTIFICATION AND QUALITY EVALUATION USING ARTIFICIAL INTELLIGENCE (AI) / MACHINE LEARNING (ML) PATTERN RECOGNITION

TECHNICAL FIELD

This patent application is directed to cellular network testing, and more specifically, to over the air channel analysis aided by artificial intelligence (AI)/machine learning (ML) pattern recognition.

BACKGROUND

A cell site, also known as a cell tower or cellular base station, includes an antenna and electronic communications equipment to support cellular mobile device communication. The antenna and equipment are typically placed in connection with a radio mast or tower, and the equipment generally connects cell site air interfaces to wireline networks, which may be comprised of fiber optic cables and coaxial cables. At a cell site, there may be a variety of signals depending on technology, e.g., 4G Long Term Evolution (LTE), 5G New Radio (NR), Dynamic Spectrum Sharing (DSS), etc. Additionally, other signals such as Citizens Broadband Radio Service (CBRS) and similar communication signals may also be present and potentially interfere with the cellular network signals and measurement of cellular network performance metrics such as adjacent channel leakage ratio (ACLR).

BRIEF DESCRIPTION OF DRAWINGS

Features of the present disclosure are illustrated by way of example and not limited in the following Figure(s), in which like numerals indicate like elements, in which:

FIG. 3A illustrates an allocation mapper chart, according to an example.

DETAILED DESCRIPTION

Figure 1:
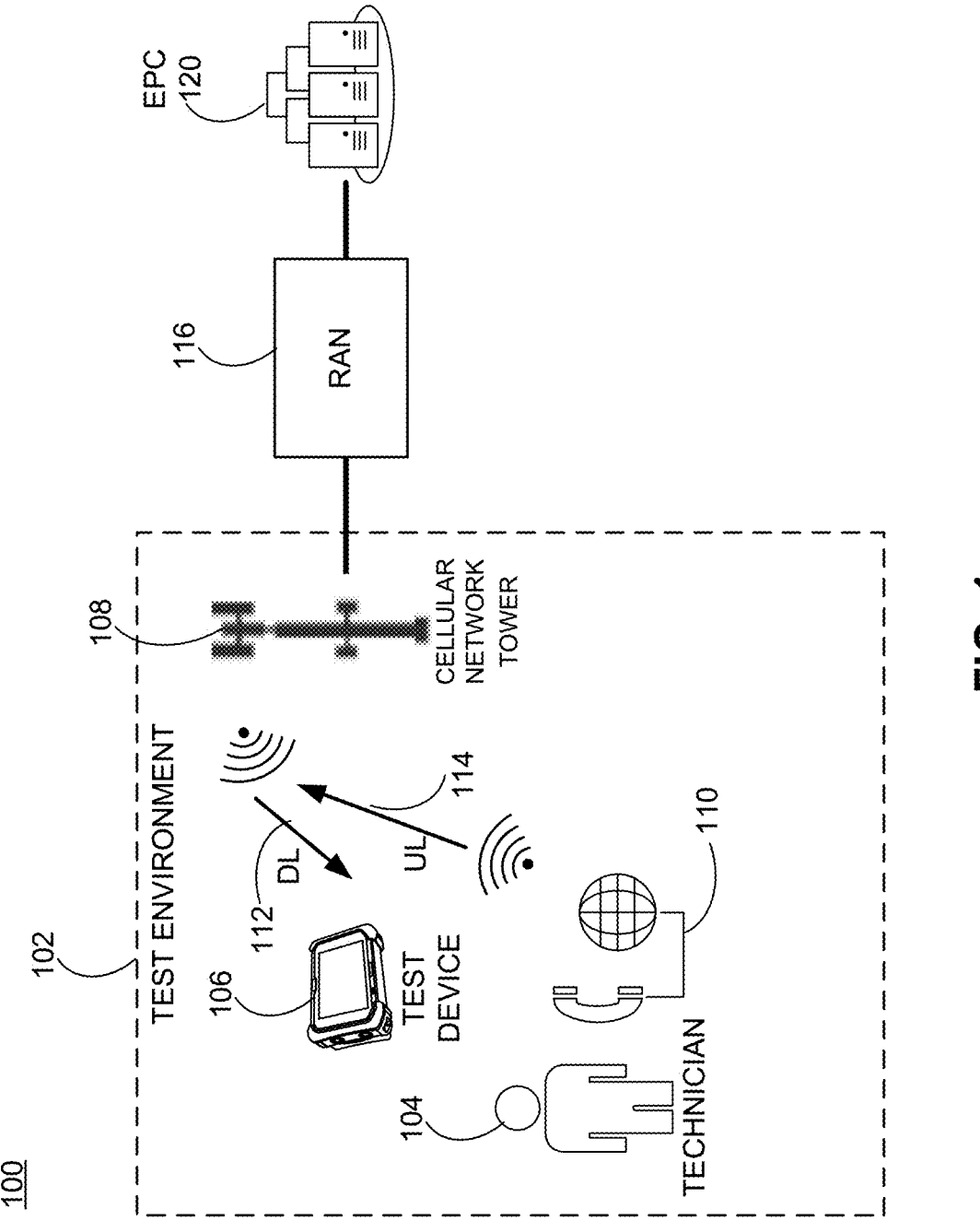
FIG. 1 illustrates a diagram of a test device in a cellular network test environment, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

With the proliferation of 5G technologies, cellular bands are increasingly crowded. Further, as people rely on cellular communications for a large variety of purposes, continuous and uninterrupted service is expected. As a result, over the air channel analysis, typically performed by technicians in the field using spectrum analyzers and similar test devices has become an important aspect of cellular services. Obtaining additional information during channel analysis near a base station may assist a technician determine causes of problems and take corrective action, but conventional systems make it difficult to acquire all needed information. Specifically, NR channels are more complex and variable than LTE channels. New radio (NR) technology uses higher frequency bands than long-term evolution (LTE) and multiple-input-multiple-output (MIMO) technologies. Frequency/time measurements and computation to determine signal technology may be time and computational resource consuming.

In some examples of the present disclosure, over the air channel analysis is performed through artificial intelligence (AI)/machine learning (ML) aided pattern recognition. A shape of a signal (e.g., control signal) may be detected through image analysis using AI/ML and technology of signal in a channel of interest may be determined from the shape. Next, the control channel (SSB, SIB1) may be determined based on period. A user (e.g., a technician) may be provided with center frequency and bandwidth for LTE or SSB, SIB1 for NR to assist with diagnosis and maintenance of the corresponding channel. Furthermore, channel analysis (e.g., EVM, SNR, time error) may be performed in a modulated state (without demodulation) and provided to the user. Moreover, massive MIMO performance may also be measured based on power difference between broadcast beam and user beam for data throughput evaluation.

Some advantages and benefits of the systems and methods described herein are readily apparent. For example, channel analysis for diagnosis and maintenance may be performed without time and computational resource consuming frequency and time measurements and computation. Faster and accurate channel parameter determination may provide rapid diagnosis of channel problems and correction avoiding costly service interruptions. Other benefits and advantages may also be apparent.

FIG. 1 illustrates a diagram 100 of a test device 106 in a test environment 102, according to an example. As shown in the diagram 100, a technician 104 may use user equipment (UE) 110 to communicate with other devices over the cellular network. Communication may include an uplink 114 to a cellular network tower 108 and a downlink 112 from the cellular network tower 108. A test device 106 to test and analyze signals from components at the cellular network tower 108 (e.g., a base station), as well as other signals which may come from other signal sources such as a radio tower, telecom signals, and others may be placed in close proximity with the user equipment (UE) 110. Thus, the test device 106 may measure a maximum EMF range assigned to the downlink 112 passed to user equipment (UE) 110 from the cellular network tower 108. The cellular network tower 108 may be part of a cell site and connected to backhaul via a radio access network (RAN) 116 and the backhaul may connect to Evolved Packet Core (EPC) 120.

A connection between the cellular network tower 108 and the rest of the world may be referred to as a backhaul link or simply backhaul. A backhaul may include wired, fiber optic and wireless components, such as microwave transmission equipment. In conventional 3G and 4G architectures, fronthaul is associated with a RAN 116 architecture including centralized base band units (BBUs), i.e., baseband controllers, and standalone remote radio heads (RRHs) installed at remote cell sites. These BBU and RRH functional blocks, as well as the equipment that performs these functions, are located further away from each other than in prior mobile backhaul models. In some instances, the RRH and BBU are at the same location. In other instances, the RRH is located at the cell site, whereas the BBU is located in a centralized and protected location where it serves multiple RRHs. The optical links that interconnect the BBU and the multiple RRHs are referred to as fronthaul. The fronthaul includes interfaces between the RRH and the BBU. The backhaul includes interfaces between the BBU and the EPC 120.

In an example, the test environment 102 may include the cell site, which includes the cellular network tower 108 or cellular base station having antennas and electronic communications equipment to support cellular mobile device communication. The antennas and equipment are typically placed in connection with a radio mast or tower, and the equipment generally connects cell site air interfaces to wireline networks, which may include fiber optic cables and coaxial cables. Typically, the cell site may be connected to backhaul via the RAN 116 and the backhaul may connect to the EPC 120.

The RAN is the part of a mobile network that connects end-user devices, like smartphones, to the cloud. This is achieved by sending information via radio waves from end-user devices to a RAN's transceivers, and finally from the transceivers to the core network which connects to the global internet. Diagram 100 shows the test device 106 performing signal analysis. In an example, the technician 104, such as a cellular service provider technician, may use the test device 106 to perform signal analysis for discovered carrier frequency and technology as well as discovered channels of selected technologies. Furthermore, interference hunting and beam centric electromagnetic field (EMF) testing on a selected carrier may be performed with the test device 106. In an example use case, the testing may be performed when the cell site is being installed, such as to ensure proper operation of the cell site with user devices, such as smartphones or other end user cellular devices. In another example use case, after installation, customers of the cellular service provider may be having technical issues, and the technician 104 may use the test device 106 to check for performance metrics on different channels.

As discussed herein, over the air channel analysis may be performed through AI/ML aided pattern recognition. A shape of a signal (e.g., control signal) may be detected through image analysis using AI/ML and technology of signal in a channel of interest may be determined from the shape. Next, the control channel (SSB, SIB1) may be determined based on period. A user (e.g., a technician) may be provided with center frequency and bandwidth for LTE or SSB, SIB1 for NR to assist with diagnosis and maintenance of the corresponding channel. Furthermore, channel analysis (e.g., EVM, SNR, time error) may be performed without demodulation and provided to the user. Moreover, massive MIMO performance may also be measured based on power difference between broadcast beam and user beam for data throughput evaluation.

It should be appreciated that a test device to perform over the air channel analysis may be a spectrum analyzer and implemented with any number components, where certain functionality may be distributed among various components and sub-systems or performed by additional components or sub-systems. Furthermore, the test device may be any RF test device including, but not limited to, a spectrum analyzer, a cellular system monitoring device, an RF power analyzer, etc.

Figure 2:
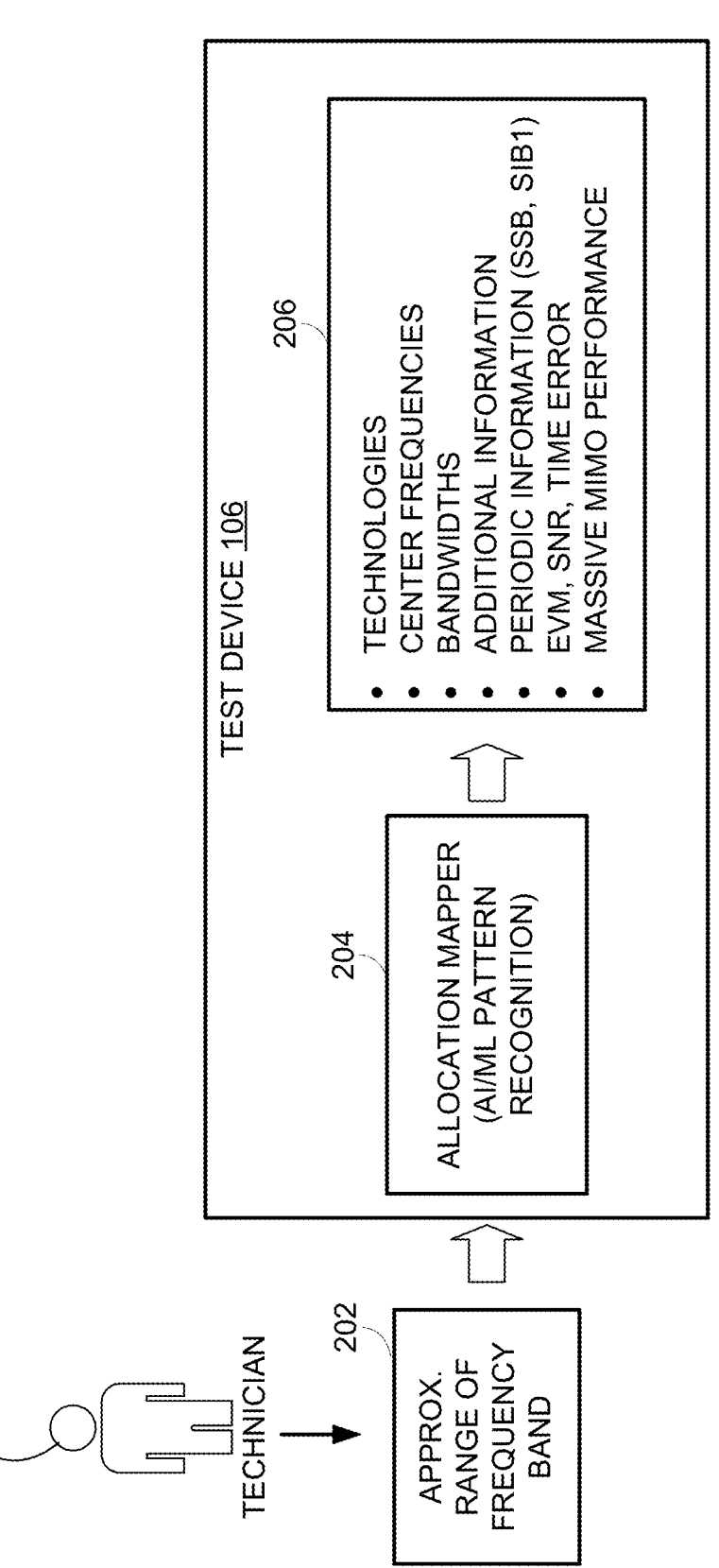
FIG. 2 illustrates a block diagram of over the air channel analysis by a test device aided by AI/ML pattern recognition, according to an example.

FIG. 2 illustrates a block diagram of over the air channel analysis by a test device aided by AI/ML pattern recognition, according to an example. As shown in FIG. 2, channel analysis may begin with the technician 104 entering approximate range of frequency band 202 into the test device 106. Based on the technician input, the AI/ML based program of the test device 106 may identify a channel of interest and detect a shape of a signal (e.g., control signal) through image analysis using AI/ML 204. Channel parameters and performance metrics such as technology, center frequency, bandwidth, additional information such as error vector magnitude (EVM), signal-to-noise ratio (SNR), time error, massive MIMO performance, etc. may be determined 206 and provided to the technician 104.

In some examples, the technology of the signal in a channel of interest may be determined from the shape (pattern recognition). Next, the control channel (SSB, SIB1) may be determined based on period. The technician may be provided with center frequency and bandwidth for LTE or SSB, SIB1 for NR to assist with diagnosis and maintenance of the corresponding channel. EVM, SNR, time error, etc. may be performed without demodulation and provided to the user. Massive MIMO performance may also be measured based on power difference between broadcast beam and user beam for data throughput evaluation.

Figure 3A:
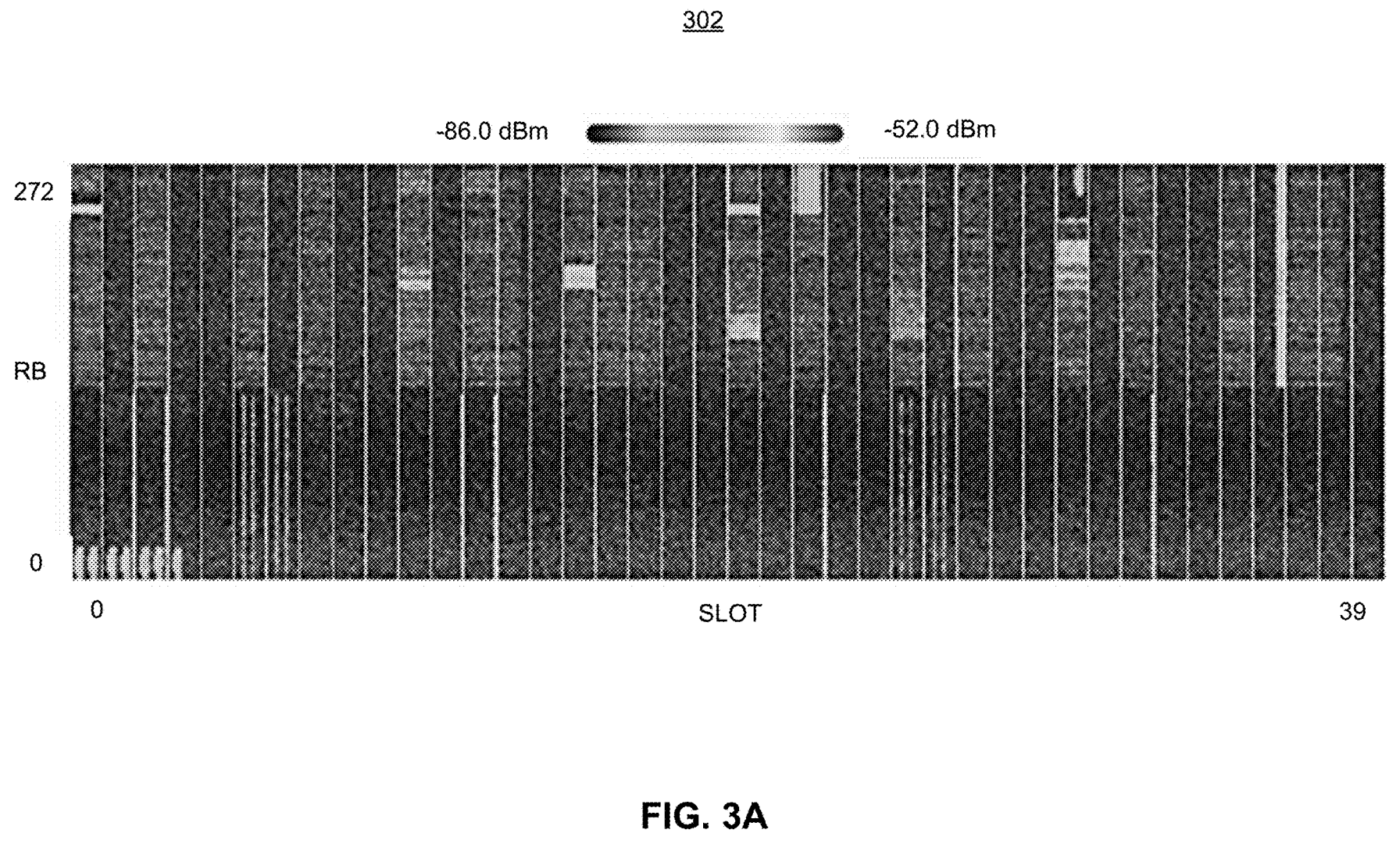

FIG. 3A illustrates an allocation mapper chart, according to an example. Allocation mapper chart 302 may be a chart that represents signals based on Orthogonal Frequency Division Multiplexing (OFDM) (LTE/NR/WiFi) on a resource block level, with the x-axis representing time and the y-axis representing frequency. The power of each resource block may be displayed using color with the colors toward the left end of the color scale (e.g., blue) representing lower powers and the colors toward the right end of the color scale (e.g., red) representing higher powers. The chart is divided into time and frequency axes. The time axis extends from left to right, while the frequency axis extends from top to bottom. Each resource block may be represented at the intersection of the time and frequency axes.

Figure 3B:
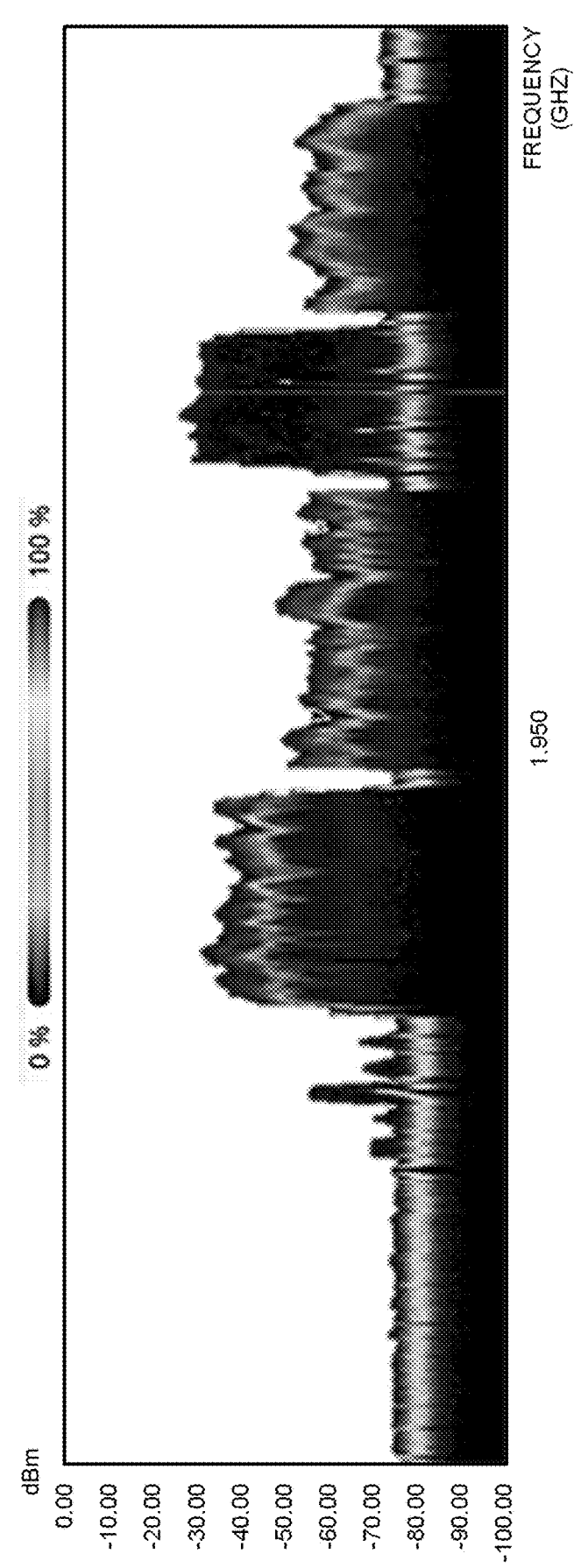
FIG. 3B illustrates a real time spectrum analyzer persistence chart, according to an example.

FIG. 3B illustrates a real time spectrum analyzer persistence chart, according to an example. Compared to the allocation mapper chart 302, a persistence chart 304 of real time spectrum analyzer output shows the frequency in form of a hit map by accumulating data in the frequency domain of the signal. On the persistence chart 304, bandwidths and approximate power levels of signals in different channels may be detected, but not much else in terms of channel analysis information. The x-axis of the persistence chart 304 represents frequency from left to right and the y-axis represents power levels from bottom to top.

Figure 3C:
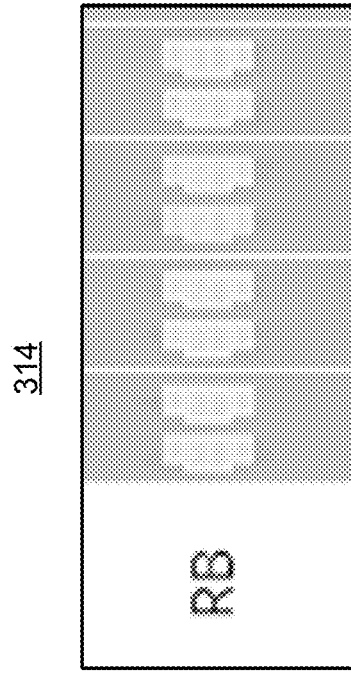
FIG. 3C illustrates example signal characteristics from which information in a resource block may be detected, according to an example.
Figure 3C:
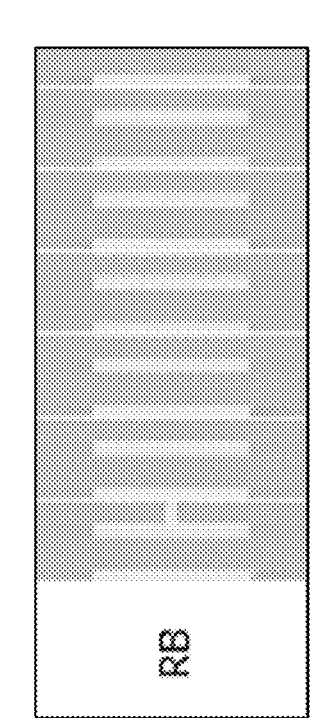
Figure 3C:
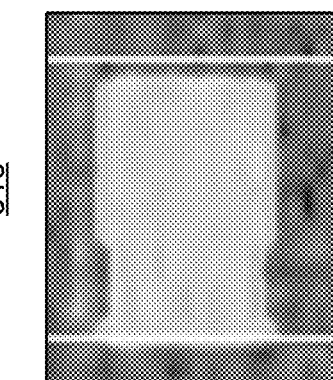

FIG. 3C illustrates example signal characteristics from which information in a resource block may be detected, according to an example. As mentioned herein, a shape of a signal (e.g., control signal) may be detected through image analysis using AI/ML. Channel parameters and performance metrics such as technology, center frequency, bandwidth, EVM, SNR, time error, etc. may then be determined from the shape and other information embedded in the shape of the signal. FIG. 3C includes three example signals (recognized patterns). Signal 312 is the pattern of an LTE signal with 5 MHz, 10 MHz, 15 MHZ, and 20 MHz subcarrier spacing. Signal 314 is the pattern of NR synchronization signals with subcarrier spacing (SCS) frequencies 15 kHz and 30 kHz. Signal 316 is the pattern of an NR C-V2X synchronization signal with SCS frequencies 15 KHz and 30 KHz. Thus, many different signals' details may be analyzed from their shapes without having to perform frequency and time measurements and computing the parameters.

Figure 3D:
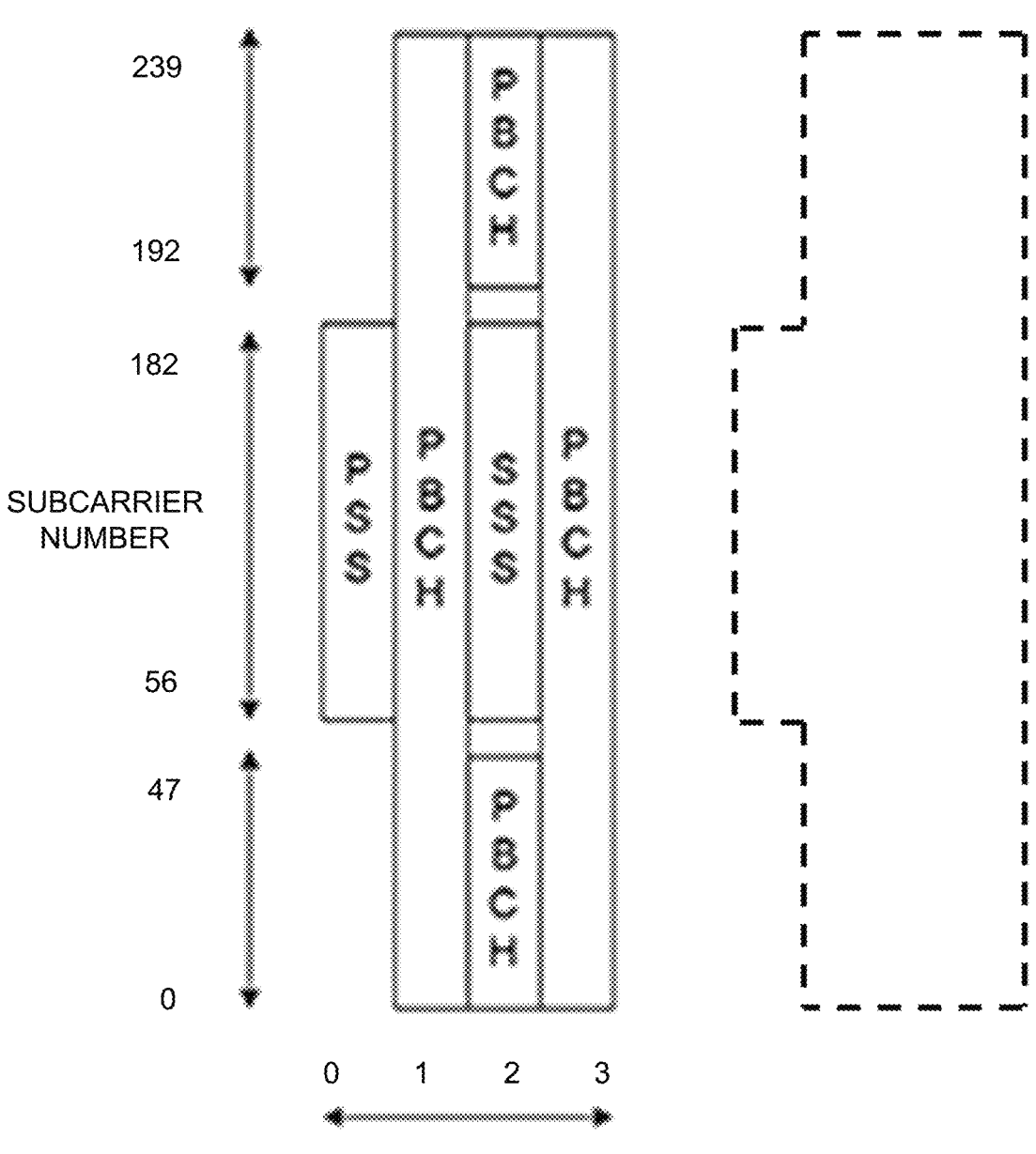
FIG. 3D illustrates time and frequency structure of a single synchronization signal block (SSB).

FIG. 3D illustrates time and frequency structure 320 of a single synchronization signal block (SSB). An SSB may be detected in allocation resource data using AI/ML based pattern recognition. In conventional systems, primary synchronization signal (PSS) detection may be time and computational resource (also power) consuming. A full search of time domain may be needed for all frequencies. Each detection requires one set of settings and execution. According to examples, image (allocation resource data) based search and pattern recognition may be performed using AI/ML assisted processing. As a result, multiple detections may be performed in one setting and much faster compared to the conventional PSS detection.

Figure 4:
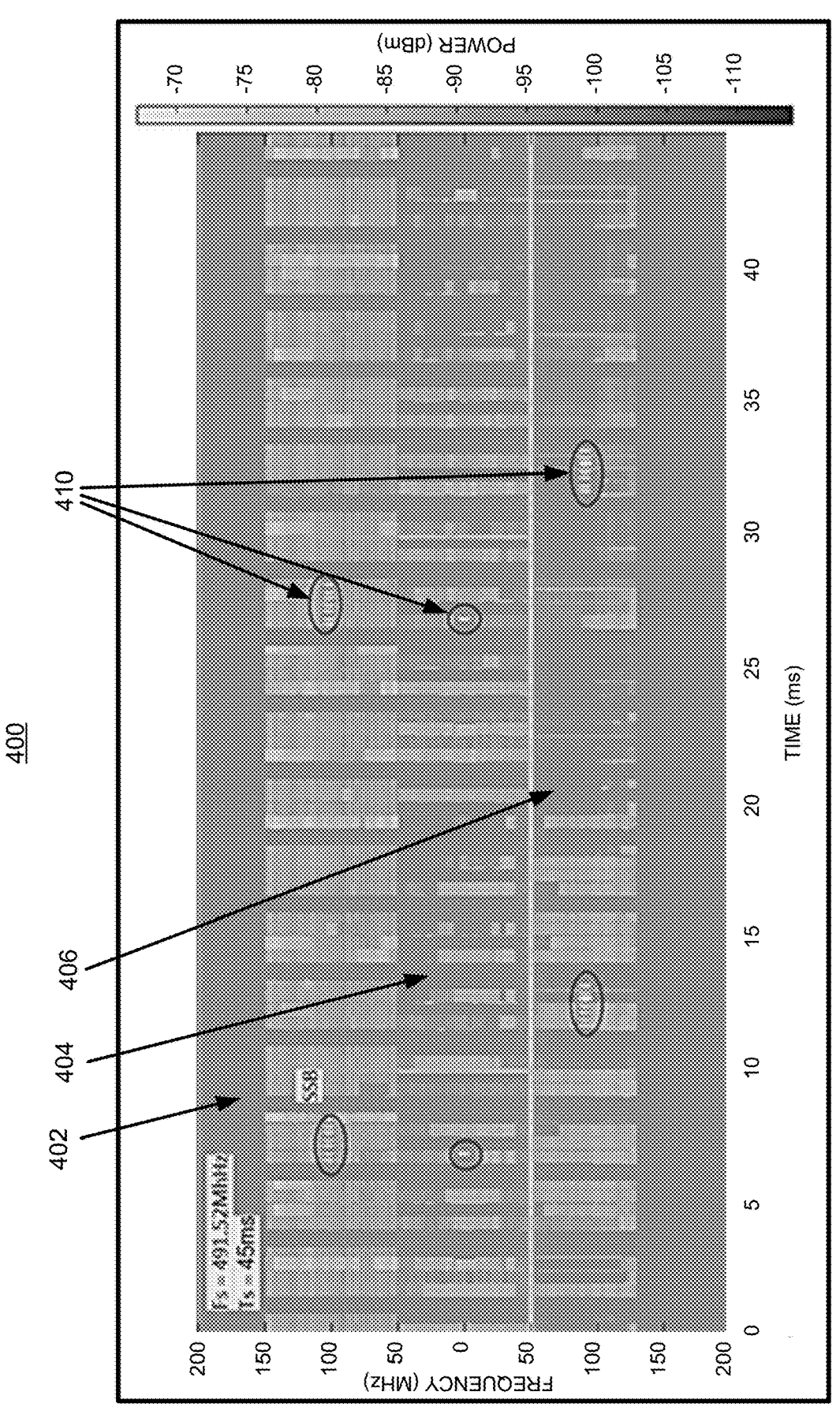
FIG. 4 illustrates allocation resource data (containing SSB) retrieval through AI/ML aided pattern recognition, according to an example.

FIG. 4 illustrates allocation resource data (containing SSB) retrieval through AI/ML aided pattern recognition, according to an example. Diagram 400 in FIG. 4 shows an allocation mapper chart with three different signals. Signals 402 404, and 406 are from three different cellular service providers. Thus, each signal may have a different technology, center frequency, bandwidth, and other characteristic parameters. The chart provides time, frequency, and power information along x- and y-axes as shown in the diagram 400. The allocation resource data contains SSB, which may be captured as an image and pattern recognition performed by the allocation mapper program.

The diagram 400 also shows captured images 410 of SSB, which may be used for pattern recognition. As discussed in conjunction with FIG. 3C, different patterns of different signal types may provide signal characteristics such as center frequency, bandwidth, technology. Furthermore, channel analysis (e.g., EVM, SNR, time error) may be performed without demodulation. Moreover, massive MIMO performance may also be measured based on power difference between broadcast beam and user beam for data throughput evaluation.

Examples described herein are directed to AI/ML based pattern recognition for cellular network channel analysis. A number of artificial intelligence and/or machine learning techniques may be employed using the principles described herein. For example, supervised, unsupervised, or reinforcement learning techniques may be employed. Example methods may include, but are not limited to, deep learning, logistic regression, artificial neural networks, cluster analysis, etc.

Figure 5A:
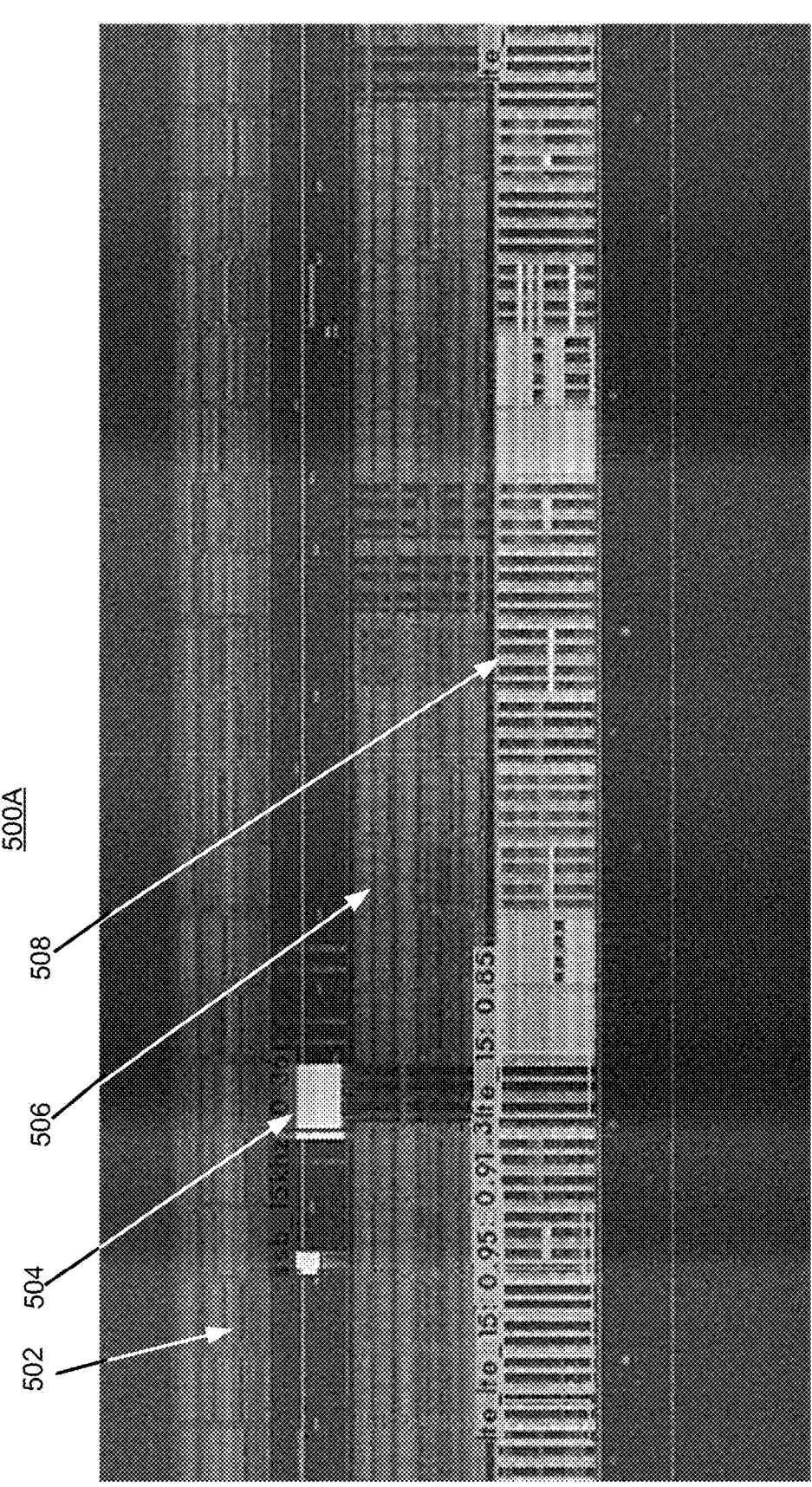
FIGS. 5A and 5B illustrate detection and position of RF technologies through AI/ML aided pattern recognition in over the air channel analysis, according to an example.
Figure 5B:
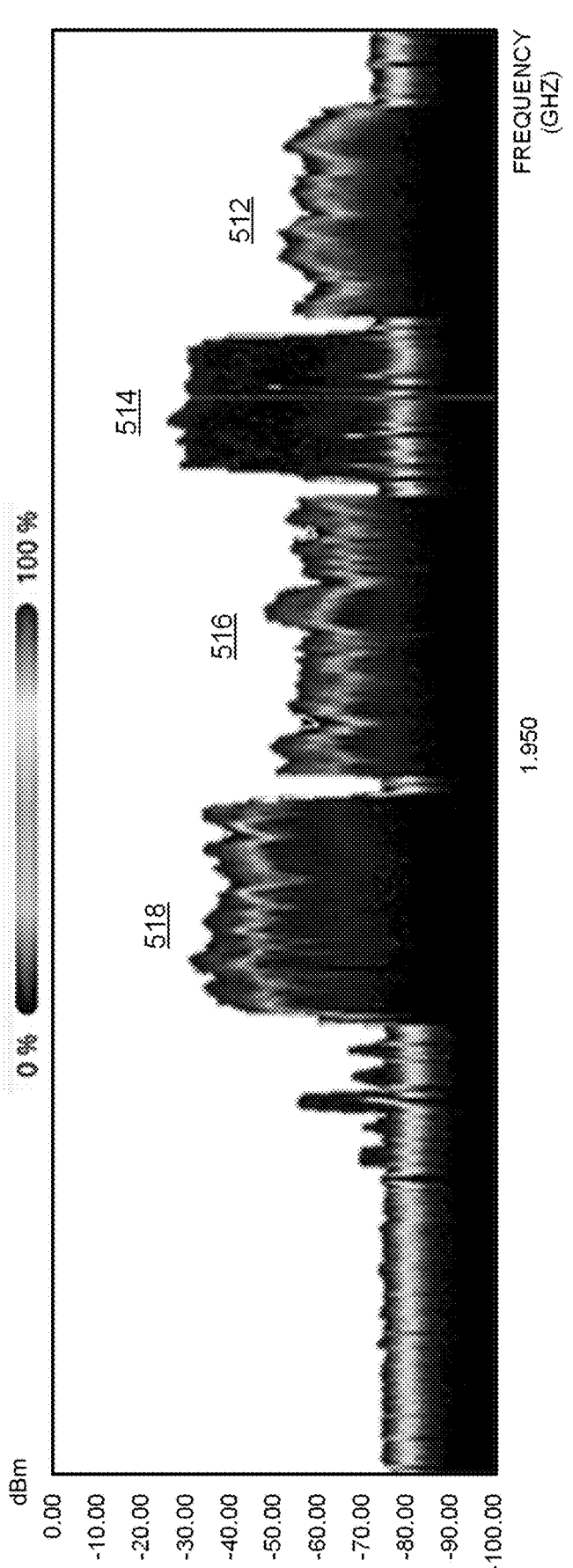

FIGS. 5A and 5B illustrate detection and position of RF technologies through AI/ML aided pattern recognition in over the air channel analysis, according to an example. FIG. 5A shows an image 500A of four different real over the air signals. Signal 502 may be a personal communication system (PCS) 1.9G signal. Signal 504 may be 5G NR signal. Signal 506 may be an LTE signal. And, signal 508 may be an LTE 15 MHz signal. Through AI/ML aided pattern recognition, center frequency and bandwidth information may be obtained for the LTE signals. For the NR signal, SSB center frequency and SCS information may be obtained.

Diagram 500B in FIG. 5B shows a real time spectrum analyzer screenshot corresponding to the signals 502 through 508 in FIG. 5A. In the spectrum analyzer screenshot signal 518 corresponds to the signal 508, signal 516 corresponds to the signal 506, signal 514 corresponds to the signal 504, and signal 512 corresponds to the signal 502. The signals in the spectrum analyzer screenshot are in persistence mode across frequency (x-axis) and power (y-axis) axes.

Figure 6A:
FIGS. 6A and 6B illustrate NR control channel analysis using an allocation mapper employing AI/ML aided pattern recognition, according to an example.
Figure 6B:
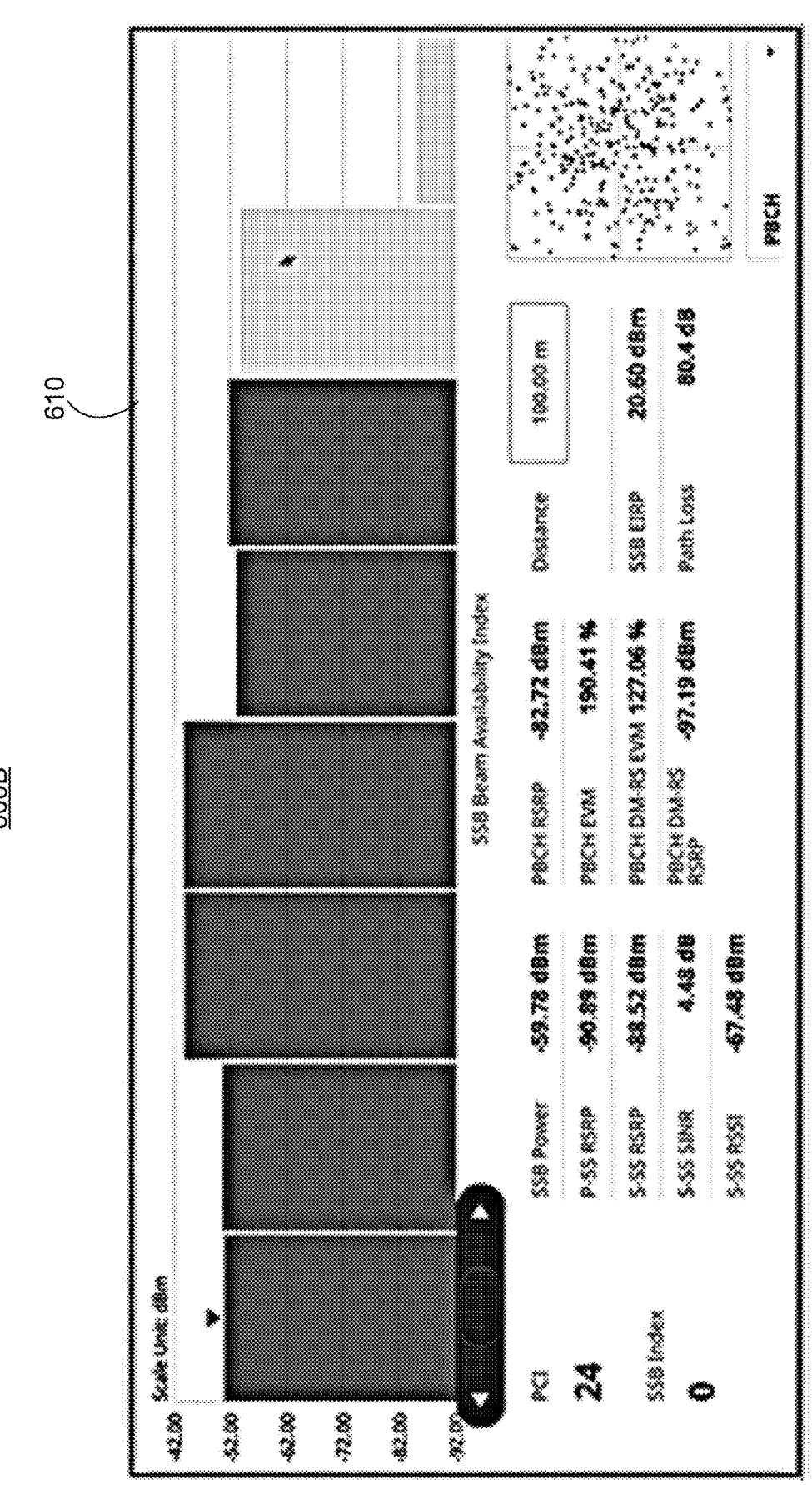

FIGS. 6A and 6B illustrate NR control channel analysis using an allocation mapper employing AI/ML aided pattern recognition, according to an example. Diagram 600A shows an image of NR control signal with SSBs 602, 604. In the NR-based network, the period of the SSB, SIB1 signals is often variable in terms of resource utilization. The period information may be used as an important resource for the diagnosis and maintenance of the corresponding channel. In other words, by using AI/ML technology to monitor broadcasting (control channel) resources, a user (a technician) may automatically search for the beam operation method (number of SSBs, its periodicity) of the base station channel, so that they can intuitively understand the corresponding channel.

In some examples, additional channel analysis and evaluation may be provided based on the extracted information as shown in diagram 600B. Channel analysis 610 may include EVM, SNR, and time error. By measuring the power difference between the broadcasting beam and user beam, the performance of massive MIMO may be measured and evaluated. In other words, information about data throughput can be provided. An image provided as result of analysis may be a grayscale normalized image.

Figure 7:
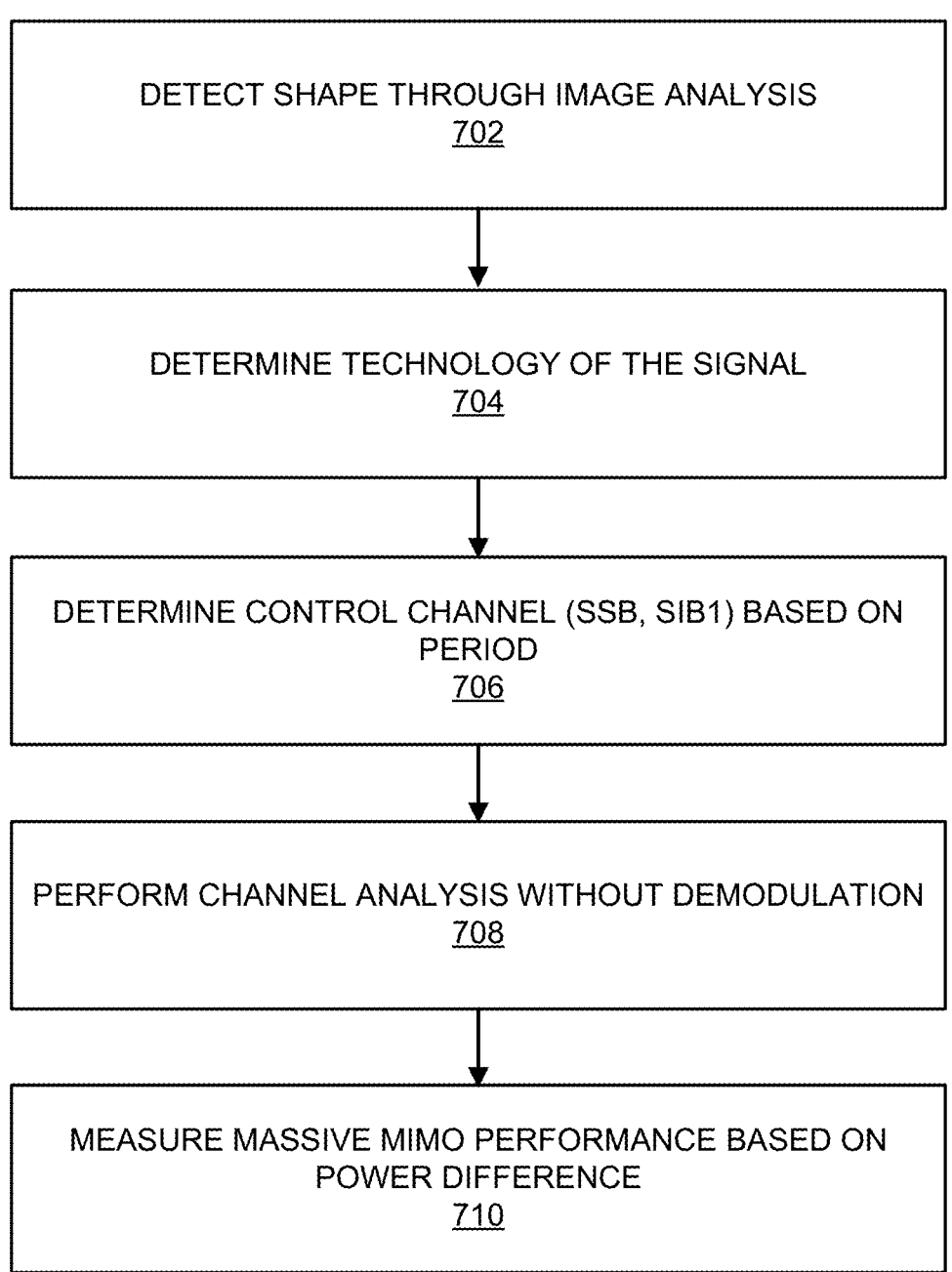
FIG. 7 illustrates a flow chart of a method for over the air channel analysis by a test device aided by AI/ML pattern recognition, according to an example.

FIG. 7 illustrates a flow chart of a method for over the air channel analysis by a test device aided by AI/ML pattern recognition, according to an example. The method 700 is provided by way of example, as there may be a variety of ways to carry out the method described herein. Although method 700 is primarily described as being performed by the test device 106 of FIG. 1, the method 700 may be executed or otherwise performed by one or more processing components of another system or a combination of systems. Each block shown in FIG. 7 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 702, the test device 106 may detect shapes of signals through image analysis. The image analysis may include AI/ML aided pattern recognition and may be faster and require less computational resources compared to frequency and time measurements and computation based on those measurements. The image, which may be provided along with analysis results may be a grayscale normalized image.

At block 704, the test device 106 may determine a technology of a detected signal such as NR, LTE, etc. In some examples, a technician may input into the test device 106 an approximate frequency range and the device may detect present signals and their parameters in the frequency range.

At block 706, the control channel (SSB, SIB1) may be determined based on period through image analysis. Center frequency, bandwidth information may be also determined and provided to the technician.

At block 708, further channel analysis (e.g., EVM, SNR, time error) may be performed without demodulation and provided to the technician. Similarly, at block 710, massive MIMO performance may also be measured based on power difference between broadcast beam and user beam for data throughput evaluation.

Figure 8:
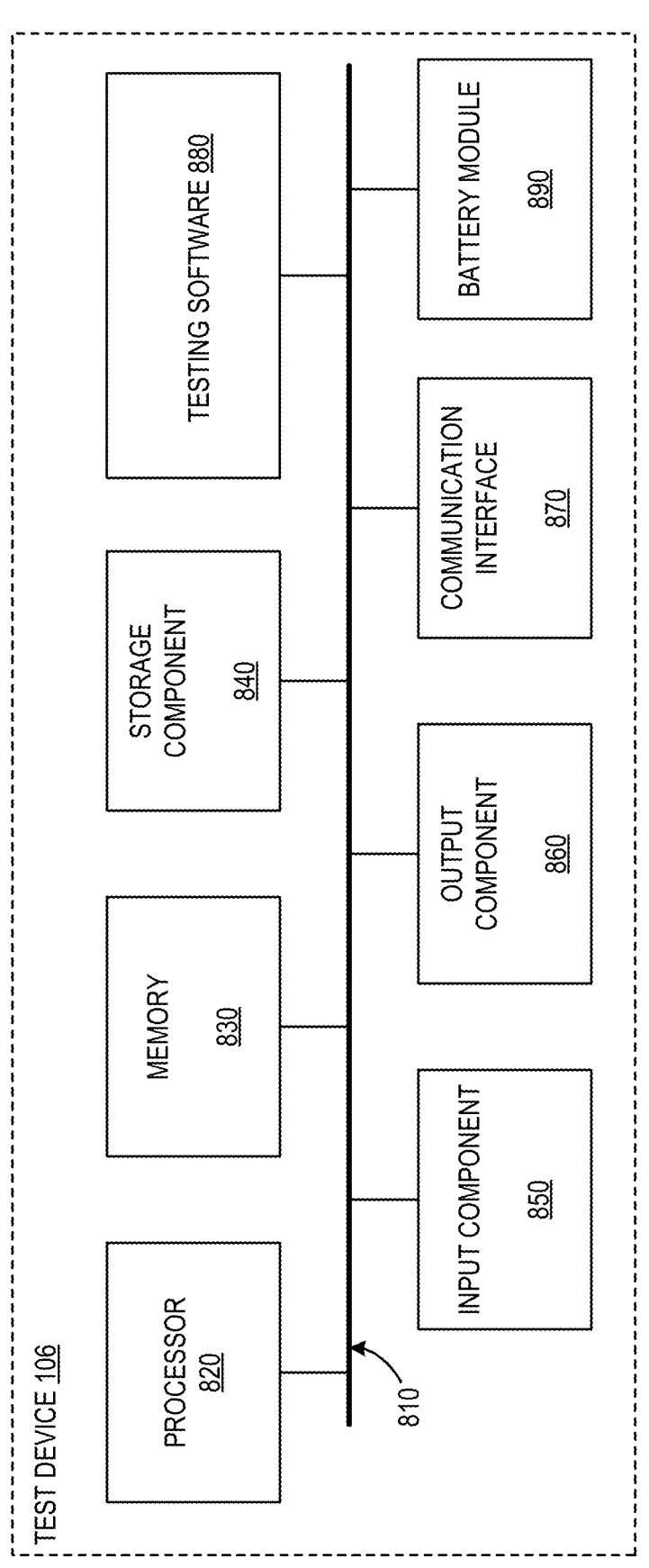
FIG. 8 illustrates a block diagram of the test device, according to an example.

FIG. 8 illustrates a block diagram of the test device 106, according to an example. As shown in block diagram, the test device 106 may include the components shown in FIG. 8. The test device 106 may include a bus 810, a processor 820, a memory 830, a storage component 840, an input component 850, an output component 860, a communication interface 870, and battery module 890.

Bus 810 includes a component that permits communication among the components of test device 106. Processor 820 may be implemented in hardware, firmware, or a combination of hardware and software. Processor 820 may include one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, processor 820 may include one or more processors capable of being programmed to perform a function. Memory 830 may include one or more memories such as a random access memory (RAM), a read only memory (ROM), and/or another type of dynamic or static storage device (e.g., a flash memory, a magnetic memory, and/or an optical memory) that store information and/or instructions for use by processor 820.

Storage component 840 stores information and/or software related to the operation and use of test device 106. For example, storage component 840 may include a hard disk (e.g., a magnetic disk, solid state disk, etc.) and/or another type of non-transitory computer-readable medium. Test device 106 may also include testing software 880 executed by the processor 820 to perform various functional tests.

The input component 850 may include a component that permits the test device 106 to receive information, such as via user input (e.g., a touch screen display, a keyboard, a keypad, a mouse, a button, a switch, and/or a microphone). Additionally, or alternatively, input component 850 may include a sensor for sensing information (e.g., a GPS component, an accelerometer, a gyroscope, and/or an actuator). Output component 860 includes a component that provides output information from the test device 106 (e.g., a display, a speaker, a user interface, and/or one or more light-emitting diodes (LEDs)). Output component 860 may include a display providing a GUI. Input component 850 and output component 860 may be combined into a single component, such as a touch responsive display, also known as an interactive display or a touchscreen.

Communication interface 870 may include a transceiver-like component (e.g., a transceiver and/or a separate receiver and transmitter) that enables test device 106 to communicate with other devices, such as via a wired connection, a wireless connection, or a combination of wired and wireless connections. Communication interface 870 may permit the test device 106 to receive information from another device and/or provide information to another device. For example, communication interface 870 may include an Ethernet interface, an optical interface, a coaxial interface, an infrared interface, an RF interface, a universal serial bus (USB) interface, a Wi-Fi interface, a cellular network interface, or the like.

Battery module 890 is connected along bus 810 to supply power to processor 820, memory 830, and internal components of the test device 106. Battery module 890 may supply power during field measurements by the test device 106. Battery module 890 may permit the test device 106 to be a portable device.

The test device 106 may perform one or more processes described herein. The test device 106 may perform these processes by processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may instruct processor 820 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The test device 106 may include components other than shown. For example, the test device 106 may include a spectrum analyzer and power meter for performing measurements described above. The number and arrangement of components shown in FIG. 8 are provided as an example. In practice, the test device 106 may include additional components, fewer components, different components, or differently arranged components than those shown in FIG. 8. Additionally, or alternatively, a set of components (e.g., one or more components) of the test device 106 may perform one or more functions described as being performed by another set of components of the test device 106.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

It should be appreciated that the apparatuses, systems, and methods described herein may minimize and/or reduce channel analysis errors and inaccuracies, and thereby facilitate more reliable and accurate measurements, specifically without service interruption. It should also be appreciated that the apparatuses, systems, and methods, as described herein, may also include, or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the backend to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more applications that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A method to perform channel analysis in a cellular network, the method comprising:
   detecting cellular signals;
   generating an allocation mapper chart that represents the detected cellular signals on a resource block level, wherein, in the allocation mapper chart, resource blocks associated with the detected cellular signals are arranged with respect to time and frequency, and wherein patterns of the resource blocks in the allocation mapper chart represent images of the detected cellular signals;
   capturing, from the allocation mapper chart, an image of a signal among the images of the detected cellular signals in a channel of interest;
   detecting a shape of the signal from the captured image of the signal using artificial intelligence (AI)/machine learning (ML) aided pattern recognition;
   identifying a center frequency and a bandwidth of the signal from the detected shape of the signal; and
   analyzing the channel of interest based on the identified center frequency and the identified bandwidth of the signal.

2. The method of claim 1, wherein analyzing the channel of interest includes analyzing at least one of error vector magnitude (EVM), signal-to-noise ratio (SNR), or time error.

3. The method of claim 1, further comprising:
   receiving an approximate frequency range input prior to detecting the one or more cellular signals.

4. The method of claim 3, wherein the cellular signals comprise a new radio (NR) signal or a long term evolution (LTE) signal.

5. The method of claim 1, further comprising:
   determining a synchronization signal block (SSB) and a system information block 1 (SIB1) based on a periodicity in the captured image of the signal.

6. The method of claim 1, further comprising:
   performing a massive multiple input multiple output (MIMO) measurement based on a power difference between a broadcast beam and a user beam of the signal for data throughput evaluation.

7. The method of claim 1, further comprising:
   providing a display of the allocation mapper chart that represents the detected cellular signals on a user interface of a test device, wherein power levels of the resource blocks in the allocation mapper chart are displayed with different colors.

8. The method of claim 7, wherein the display of the allocation mapper chart includes a frequency axis, a power axis, and a time axis.

9. The method of claim 7, wherein the display of the allocation mapper chart is a grayscale normalized image.

10. The method of claim 7, further comprising:
   generating an image file for the captured image of the signal; and
   generating one or more annotation files identifying at least a location of the captured image of the signal and a class of the image file for the image file.

11. A test device to perform channel analysis in a cellular network, the test device comprising:
   a cellular network interface to receive cellular communication signals from one or more base stations;
   an interactive display to present signal parameters and measurement results and to receive configuration input from a user; and
   a processor coupled to the cellular network interface and the interactive display, the processor to:
      generate an allocation mapper chart that represents the received cellular communication signals on a resource block level, wherein, in the allocation mapper chart, resource blocks associated with the received cellular communication signals are arranged with respect to time and frequency, and wherein patterns of the resource blocks in the allocation mapper chart represent images of the received cellular communication signals;
      capture, from the allocation mapper chart, an image of a signal among the images of the received cellular communication signals in a channel of interest;
      detect a shape of the signal from the captured image of the signal using artificial intelligence (AI)/machine learning (ML) aided pattern recognition;
      identify a center frequency and a bandwidth of the signal from the detected shape of the signal; and
      analyze the channel of interest based on the identified center frequency and the identified bandwidth of the signal.

12. The test device of claim 11, wherein the processor is further to:
   determine a synchronization signal block (SSB) and a system information block 1 (SIB1) based on a periodicity in the captured image of the signal.

13. The test device of claim 11, wherein the signal parameters comprise at least one of error vector magnitude (EVM), signal-to-noise ratio (SNR), or time error.

14. The test device of claim 11, wherein the cellular communication signals comprise a new radio (NR) signal or a long term evolution (LTE) signal.

15. The test device of claim 11, wherein the processor is further to:

perform a massive multiple input multiple output (MIMO) measurement based on a power difference between a broadcast beam and a user beam of the signal for data throughput evaluation.

16. The test device of claim 11, wherein the processor is further to:

generate an image file for the captured image of the signal; and generate one or more annotation files identifying at least a location of the captured image of the signal and a class of the image file for the image file.

17. The test device of claim 16, wherein the processor is further to:

provide the captured image of the signal and the signal parameters through the interactive display employing a frequency axis, a power axis, and a time axis.

18. A non-transitory computer-readable storage medium having executable instructions stored thereon, which when executed cause a processor of a test device to perform channel analysis in a cellular network, comprising causing the processor to:

detect cellular communication signals;

generate an allocation mapper chart that represents the detected cellular communication signals on a resource block level, wherein, in the allocation mapper chart, resource blocks associated with the detected cellular communication signals are arranged with respect to time and frequency, and wherein patterns of the resource blocks in the allocation mapper chart represent images of the detected cellular communication signals;

capture, from the allocation mapper chart, an image of a signal among the images of the detected cellular communication signals in a channel of interest;

detect a shape of the signal from the captured image of the signal using artificial intelligence (AI)/machine learning (ML) aided pattern recognition;

identify, from the detected shape of the signal, a center frequency and a bandwidth of the signal; and analyze the channel of interest based on the identified center frequency and the identified bandwidth of the signal.

19. The non-transitory computer-readable storage medium of claim 18, wherein the executable instructions further cause the processor to:

perform a massive multiple input multiple output (MIMO) measurement based on a power difference between a broadcast beam and a user beam of the signal for data throughput evaluation.

20. The non-transitory computer-readable storage medium of claim 18, wherein the executable instructions cause the processor to analyze the channel of interest in at least one of error vector magnitude (EVM), signal-to-noise ratio (SNR), or time error.

* * * * *